(12) United States Patent
Zhao

(10) Patent No.: US 8,471,976 B2
(45) Date of Patent: Jun. 25, 2013

(54) LIQUID CRYSTAL DISPLAY ASSEMBLY

(75) Inventor: Jiang Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 46 days.

(21) Appl. No.: 13/280,289

(22) Filed: Oct. 24, 2011

(65) Prior Publication Data

US 2012/0314152 A1 Dec. 13, 2012

(30) Foreign Application Priority Data

Jun. 9, 2011 (CN) .......................... 2011 1 0154016

(51) Int. Cl.
*G02F 1/1333* (2006.01)
(52) U.S. Cl.
USPC ............. 349/58; 362/632; 362/633; 362/634
(58) Field of Classification Search
USPC ..................................... 349/58; 362/632–634
See application file for complete search history.

(56) References Cited

U.S. PATENT DOCUMENTS

| 6,919,937 | B2 * | 7/2005 | Kim et al. ....................... 349/58 |
| 6,937,297 | B2 * | 8/2005 | Kang et al. ..................... 349/58 |
| 6,950,154 | B2 * | 9/2005 | Lee ................................. 349/58 |
| 7,573,702 | B2 * | 8/2009 | Hong et al. ............. 361/679.26 |
| 8,284,343 | B2 * | 10/2012 | Koike et al. .................... 349/58 |
| 2001/0038523 | A1 * | 11/2001 | Bang ............................ 361/681 |
| 2010/0079933 | A1 * | 4/2010 | Liang et al. ............. 361/679.01 |
| 2012/0307451 | A1 * | 12/2012 | Shukla et al. ................. 361/699 |

* cited by examiner

*Primary Examiner* — Bumsuk Won
*Assistant Examiner* — Jia Pan
(74) *Attorney, Agent, or Firm* — Altis Law Group, Inc.

(57) ABSTRACT

A liquid crystal display (LCD) assembly includes a liquid crystal display device for displaying images, a first frame receiving the LCD device, a second frame receiving the first frame, at least a clamping component, and at least an ejecting component. The at least a clamping component is mounted between the first frame and the second frame and configured for clamping the first frame in the second frame. The at least an ejecting component is mounted between the first frame and the second frame and configured for providing a driving force for ejecting the first frame out of the second frame.

10 Claims, 7 Drawing Sheets

LIQUID CRYSTAL DISPLAY ASSEMBLY

BACKGROUND

1. Technical Field

The present disclosure relates to a liquid crystal display (LCD) assembly.

2. Description of Related Art

LCD devices are widely applied in electronic products such as television (TV) sets and computers. Usually, the LCD devices are mounted in a metallic inner frame and the inner frame is received in a plastic outer frame. The outer frame includes extending hooks for clamping the inner frame. When disassembling the LCD device, the hooks are pressed to disengage the inner frame, and the inner frame is pried out of the outer frame by tools such as a screwdriver. It is inconvenient to disassemble the LCD devices.

Therefore, it is desirable to provide a disclosure, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
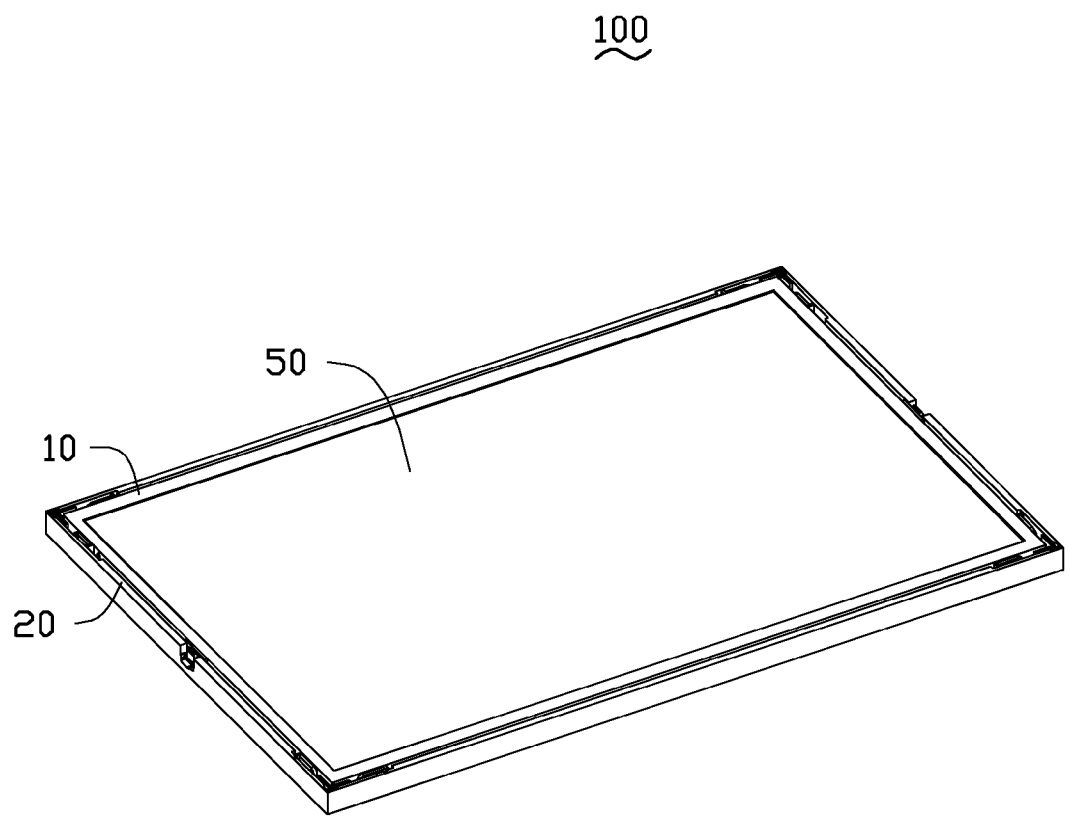
FIG. 1 is an isometric view of an LCD assembly, according to an exemplary embodiment.
Figure 2:
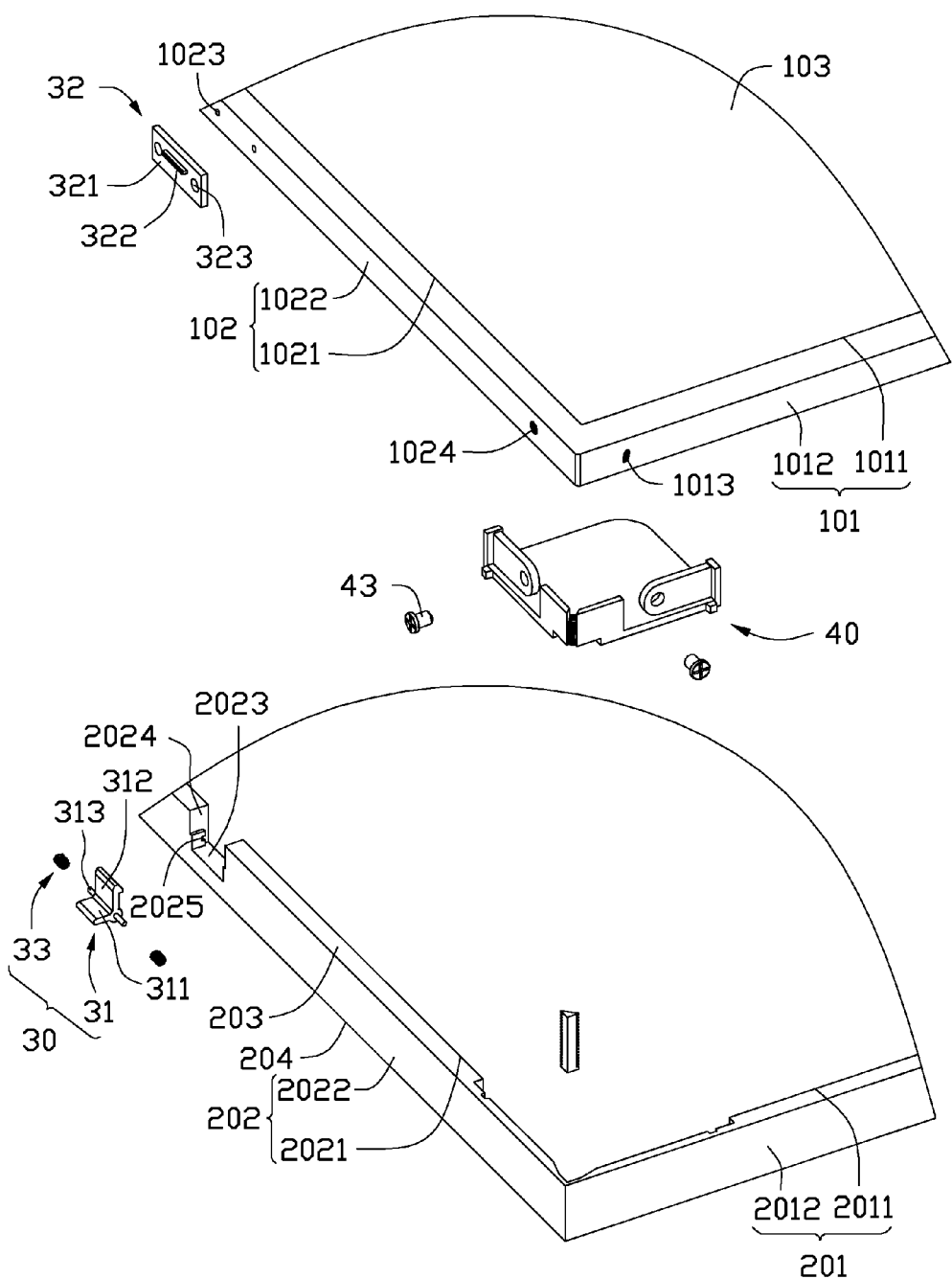
FIG. 2 is a sectional, exploded view of the LCD assembly of FIG. 1.
Figure 3:
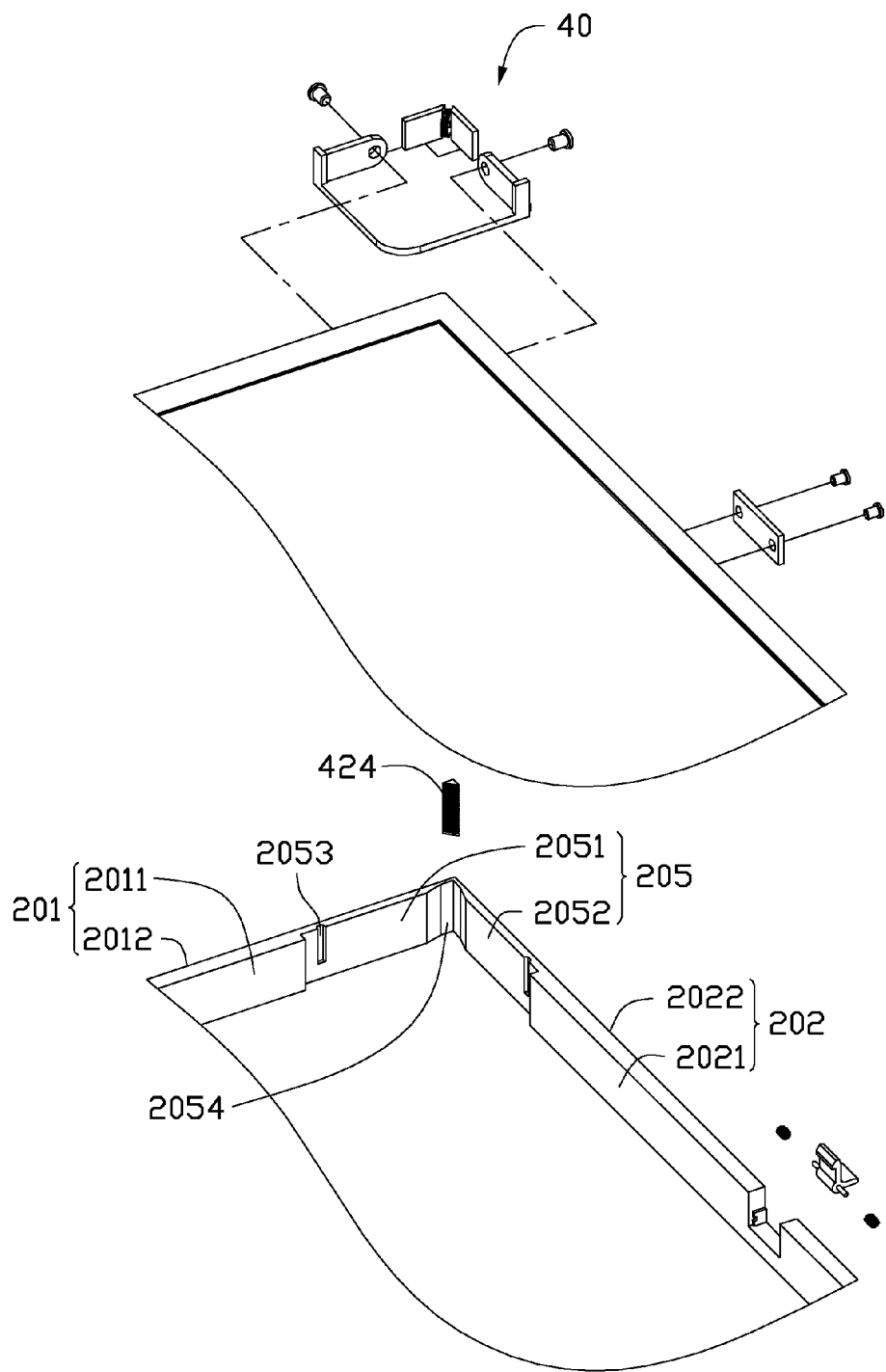
FIG. 3 is another sectional, exploded view of the LCD assembly of FIG. 1.

Referring to FIGS. 1 to 3, an LCD assembly 100, according to an exemplary embodiment, includes a first frame 10, a second frame 20, two clamping components 30, four ejecting components 40, and an LCD device 50.

The first frame 10 is made of metal and is generally rectangular. The first frame 10 includes a pair of first sidewalls 101, opposite to each other and a pair of second sidewalls 102, opposite to each other and perpendicularly connected between the first sidewalls 101. The first sidewalls 101 and the second sidewalls 102 cooperatively define a receiving space 103 for receiving the LCD device 50.

Each of the first sidewalls 101 includes a first surface 1011 facing the other first sidewall 101 and a second surface 1012 opposite to the first surface 1011. Each of the second sidewalls 102 includes a third surface 1021 facing the other second sidewall 102 and a fourth surface 1022 opposite to the third surface 1021. Each second surface 1012 defines a first aligning hole 1013 adjacent to a corresponding fourth surface 1022. Each fourth surface 1022 defines two mounting holes 1023 generally in the middle of the fourth surface 1022 and a second aligning hole 1024 adjacent to a corresponding second surface 1012.

The second frame 20 is made of plastic and is generally rectangular. The second frame 20 includes a pair of opposite third sidewalls 201, a pair of opposite fourth sidewalls 202 perpendicularly connected between the third sidewalls 201, a top surface 203, and a bottom surface 204 opposite to the top surface 203.

Each of the third sidewalls 201 includes a fifth surface 2011 facing the other third sidewall 201 and a sixth surface 2012 opposite to the fifth surface 2011. Each of the fourth sidewalls 202 includes a seventh surface 2021 facing the other fourth sidewall 202 and an eighth surface 2022 opposite to the seventh surface 2011. The fifth surface 2011 and the seventh surface 2021 perpendicularly connect between the top surface 203 and the bottom surface 204. Each of the fourth sidewalls 202 defines an opening 2023 generally in the middle of the corresponding fourth sidewall 202. Each opening 2023 includes a pair of inner surfaces 2024 perpendicular to the seventh surface 2021. Each inner surface 2024 defines a pivoting hole 2025. The two pivoting holes 2025 of the pair of inner surfaces 2024 are aligned with and opposite to each other.

The second frame 20 defines four generally L-shaped leading grooves 205 at four corners. Each leading groove 205 includes a first leading surface 2051 concave from the fifth surface 2011 and a second leading surface 2052 concave from the seventh surface 2021. Each first leading surface 2051 and each second leading surface 2052 respectively define an engaging groove 2053. Each engaging groove 2053 extends from the top surface 203 toward the bottom surface 204 but does not pass through the bottom surface 204. The second frame 20 further defines a receiving groove 2054 at a joint of a first leading surface 2051 and a second leading surface 2052.

Each clamping component 30 includes a hook element 31, a connection element 32, and two springs 33. Each hook element 31 is generally L-shaped and includes a generally rectangular operating portion 311, a hook portion 312 substantially perpendicular to the operating portion 311, and two shaft portions 313. Each shaft portion 313 extends from a joint of the operating portion 311 and the hook portion 312. Each shaft portion 313 spatially corresponds to a pivoting hole 2025. The two shaft portions 313 coaxially extend in opposite directions.

Each connection element 32 includes a generally rectangular mounting portion 321 and a contact portion 322 extending up from the mounting portion 321. The mounting portion 321 defines two screw holes 323 spatially corresponding to the two mounting holes 1023 of one of the fourth surfaces 1022. Each spring 33 is to be sleeved around the outside of a shaft portion 313.

Figure 4:
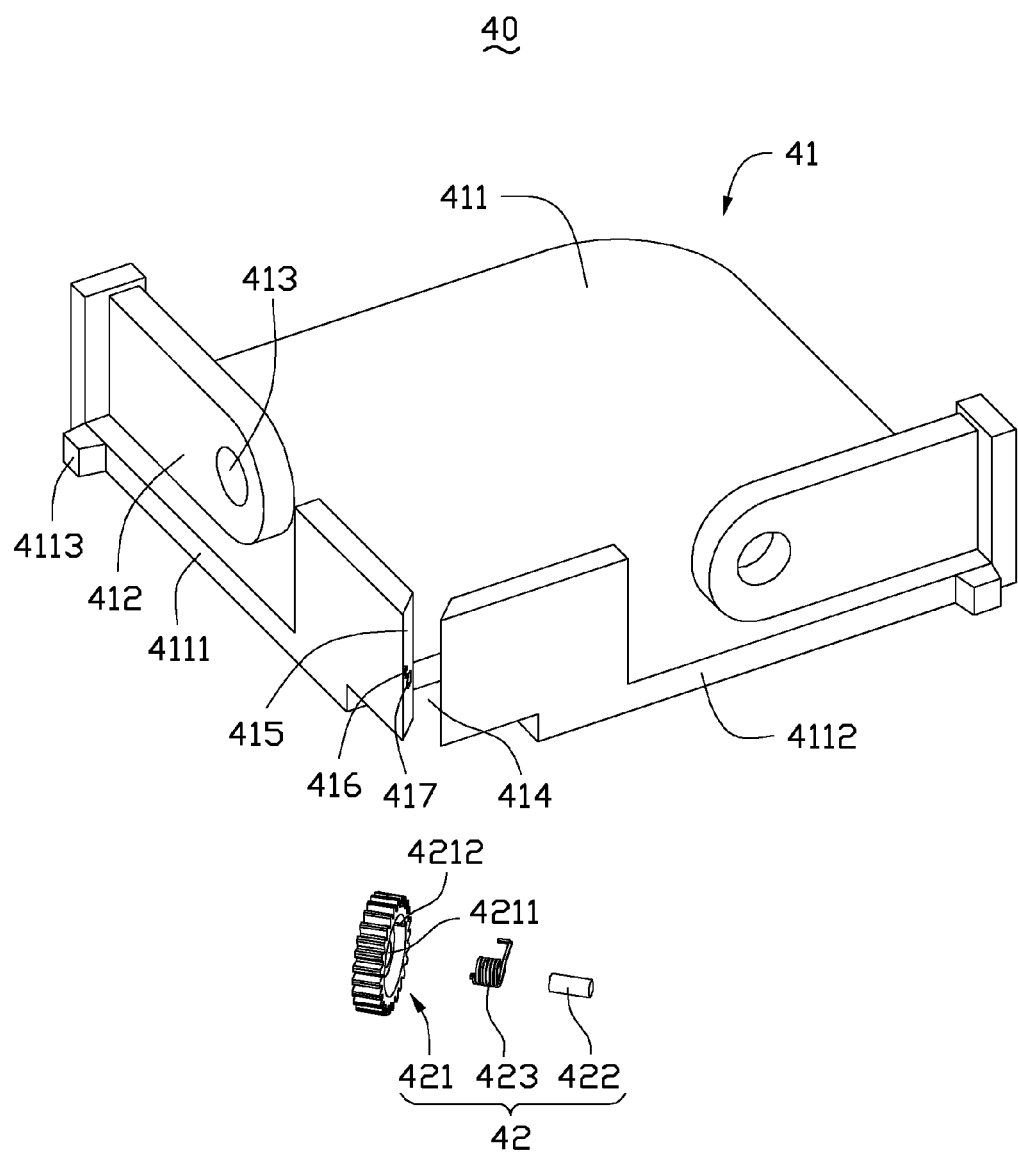
FIG. 4 is a schematic isometric view of an ejecting component of the LCD assembly of FIG. 2.
Figure 5:
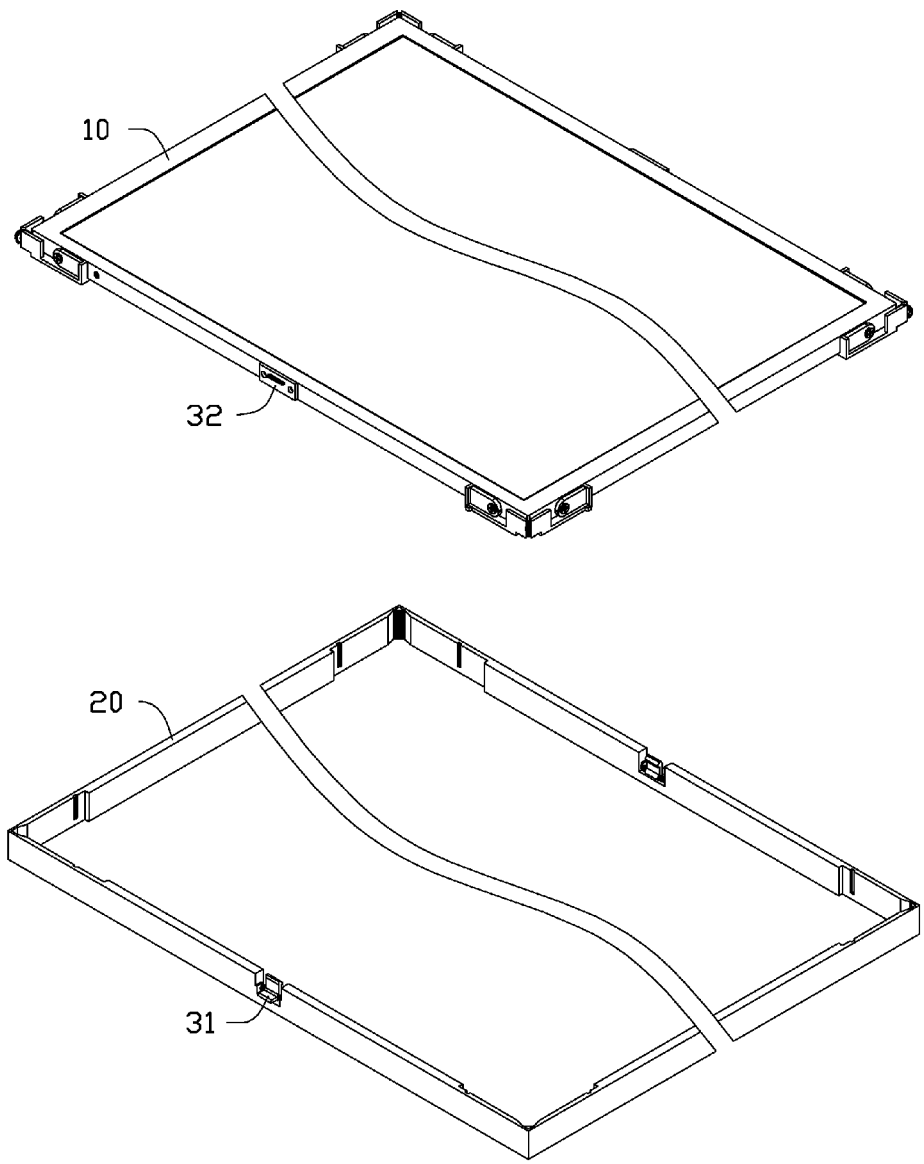
FIG. 5 is a partially assembled view of the LCD assembly of FIG. 1.

Referring to FIGS. 3 and 4, each ejecting component 40 includes a holding member 41 and a driving component 42. The holding member 41 includes a base portion 411 and two wall portions 412. The base portion 411 includes a first periphery 4111, a second periphery 4112 perpendicularly connected to the first periphery 4111, and two stoppers 4113. The two wall portions 412 are discontinued and perpendicularly extend upward from the first periphery 4111 and the second periphery 4112. Each wall portion defines a through hole 413. The two stoppers 4113 respectively extend from the first periphery 4111 and the second periphery 4112. The two stoppers 4113 spatially correspond to the two engaging grooves 2053 of a leading groove 205. The holding member 41 defines a receiving gap 414 at a joint of the two wall portions 412. The receiving gap 414 includes a pair of mounting surfaces 415. Two protrusions 416 extend upward from one of the mounting surfaces 415. Each mounting surface 415 defines a blind hole 417. Two blind holes 417 of the pair of mounting surfaces 415 are opposite to each other.

Each driving component 42 includes a gear 421, a rotation shaft 422, a reposition spring 423, and a toothed bar 424. The gear 421 is generally cylindrical and defines a central hole 4211 and a mounting groove 4212 adjacent to the central hole 4211. The central hole 4211 is circular and passes through the gear 421 along a central axis of the gear 421. The mounting groove 4212 is defined on an inner surface opposite to teeth of the gear 421. The rotation shaft 422 is cylindrical and the diameter of the rotation shaft 422 is slightly less than that of the central hole 4211. The reposition spring 423 is to be compactly sleeved around the outside of the rotation shaft 422 and is fitted into the central hole 4211. The toothed bar 424 spatially corresponds to a receiving groove 2054 and includes a plurality of teeth for meshing with the gear 421.

The LCD device 50 is received in the receiving space 103 for displaying images.

Referring to FIGS. 2 to 5, when assembling, the two screw holes 323 of each connection element 32 are aligned to the two mounting holes 1023 of a fourth surface 1022, each connection element 32 is mounted to a fourth surface 1022 by two screws 43. The two springs 33 of each clamping component 30 are respectively sleeved the outside of the shaft portions 313 of a hook 31. The two shaft portions 313 are received in the two pivoting holes 2025 of an opening 2023. Each spring 33 presses on an inner surface 2024. Each toothed bar 424 is received and is adhered in a receiving groove 2054. Each reposition spring 423 is sleeved around the outside of the rotation shaft 422. The rotation shaft 422 is fitted into the central hole 4211 of the gear 421. One end of the reposition spring 423 is fixed between the pair of protrusions 416 of one of the mounting surfaces 415. The other end of the reposition spring 423 is fixed in the mounting groove 4212 of the gear 421. Each gear 421 is received in the receiving gap 414 with the rotation shaft 422 mounted into the blind holes 417, such that the gear 421 can be rotated about the rotation shaft 422. The reposition spring 423 is in an initial position having no deformation. The two through holes 413 of each holding member 41 are aligned to the first aligning hole 1013 and the second aligning hole 1021 and each holding member 41 is fixed to the first frame 10 by two screws. Each base portion 411 holds the first frame 10. Each hold member 41 is received in a leading groove 205.

The four ejecting components 40 are mounted at four corners of the first frame 10. Each hook 31 is pressed to rotate to a corresponding eighth surface 2022, such that the first frame 10 can be pressed into the second frame 20 with each gear 421 meshing with a corresponding toothed bar 424. Each gear 421 is rotated about the shaft portion 422 and the reposition spring 423 of each ejecting component 40 generates deformation, the two stoppers 4113 of each holding member 41 are received in two engaging grooves 2053 of a corresponding leading groove 205. Then, each hook 31 is released and the hook portion 312 presses on the contact portion 322 of a connection element 32. The first frame 10 is clamped in the second frame 20 by the two clamping components 30 mounted between the first frame 10 and the second frame 20. The reposition spring 423 of each ejecting component 40 provides a driving force to the gear 421 to rotate back to the initial position.

Figure 6:
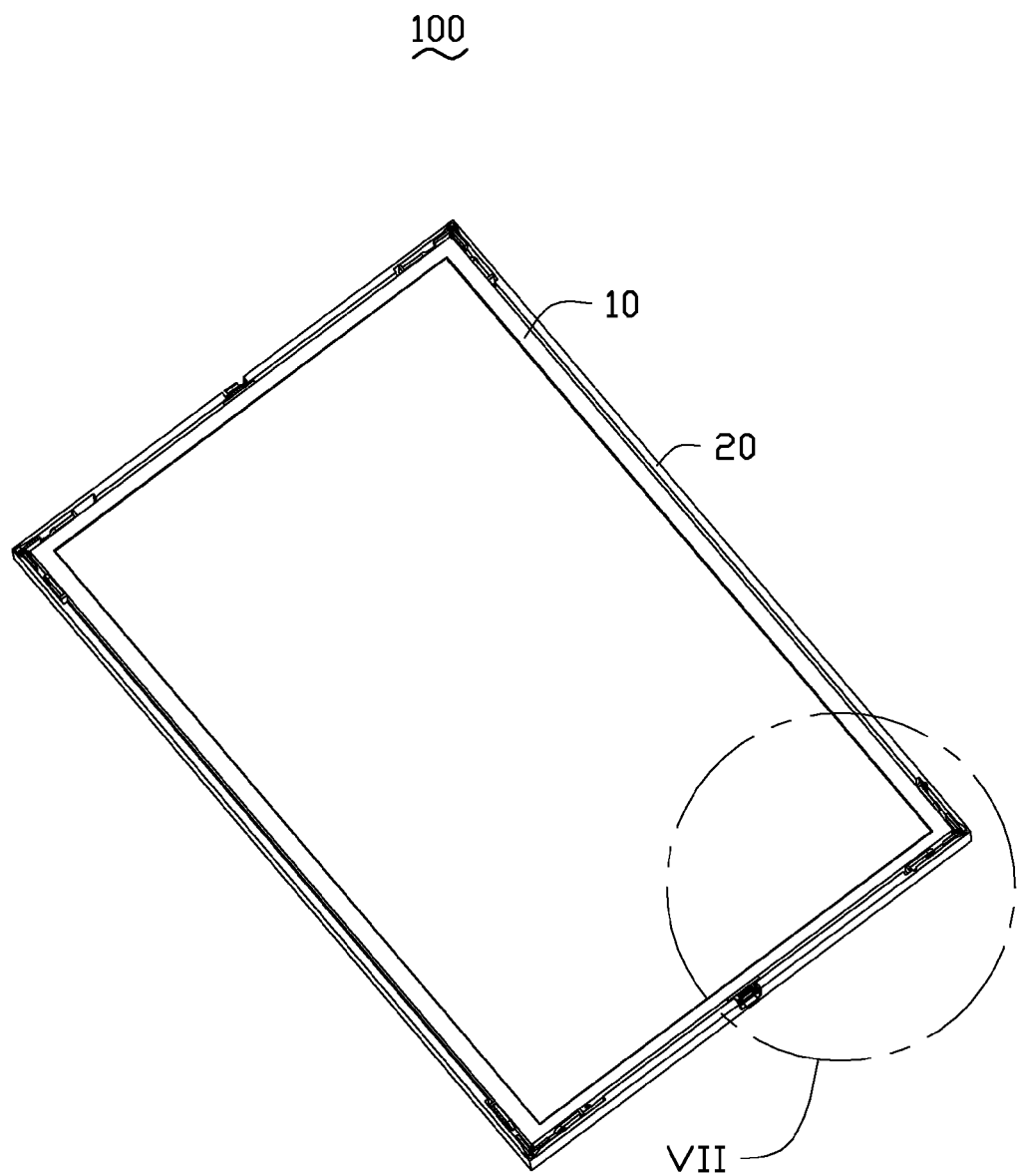
FIG. 6 is similar to FIG. 1, but viewing the LCD assembly from another angle.
Figure 7:
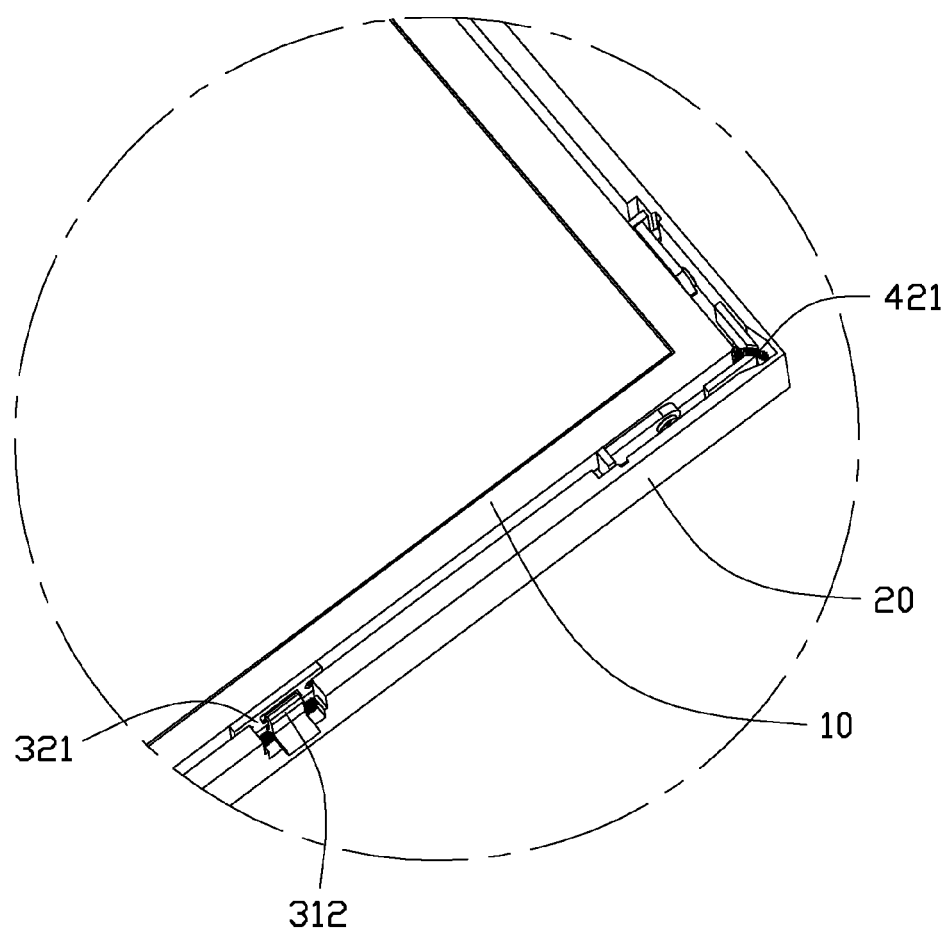
FIG. 7 is a sectional enlarged view of a circled portion VII of the LCD assembly of FIG. 6.

Referring to FIGS. 3, 6 and 7, when disassembling the first frame 10 from the second frame 20, each hook 31 is pressed to move away from a corresponding contact portion 322. The reposition spring 423 drives the gear 421 of each ejecting component 40 to rotate back to the initial position with the diving force, the gear 421 moves relative to the toothed bar 424, such that the first frame 10 is ejected out of the second frame 20 by the ejecting components 40. Therefore, it is convenient to disassemble the first frame 10.

The clamping components 30 clamp the first frame 10 in the second frame 20. The ejecting components 40 provide a driving force for ejecting the first frame 10 out of the second frame 20. In alterative embodiments, the number of the clamping components 30 and ejecting components 40 is not limited.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A liquid crystal display assembly, comprising:
   a liquid crystal display device for displaying images;
   a first frame receiving the liquid crystal display device;
   a second frame receiving the first frame;
   at least one clamping component mounted between the first frame and the second frame, the at least one clamping component being configured for clamping the first frame in the second frame; and
   at least one ejecting component mounted between the first frame and the second frame, the at least one ejecting component being configured for providing a driving force for ejecting the first frame out of the second frame;
   wherein each of the at least one ejecting component comprises a holding member and a driving component; the holding member comprises a base portion and two wall portions extending from the base portion; the base portion holds the first frame; the wall portions are perpendicular to each other and mounted to one corner of the first frame; the holding member defines a receiving gap at a joint of the two wall portions; the receiving gap comprises a pair of mounting surfaces; each mounting surface defines a blind hole; the driving component comprises a gear, a rotation shaft, a reposition spring, and a toothed bar, the gear defines a central hole passing through the gear along a central axis of the gear; the gear is received in the receiving gap, the rotation shaft is received in the central hole, two ends of the rotation shaft are mounted to two blind holes of the mounting surfaces, the reposition spring is sleeved around the rotation shaft and fitted into the central hole, one end of the reposition spring is fixed to one of the mounting surfaces, the other end of the reposition spring is fixed to the gear; the toothed bar is mounted to a corner of the second frame and comprises a plurality of teeth meshing with the gear.

2. The liquid crystal display assembly of claim 1, wherein the receiving gap further comprises a pair of protrusions extending outwards from one of the mounting surfaces; the gear further defines a mounting groove on an inner surface; one end of the reposition spring is fixed between the pair of protrusions, the other end of the reposition spring is fixed in the mounting groove.

3. The liquid crystal display assembly of claim 1, wherein the first frame comprises a pair of first sidewalls and a pair of second side walls; each of the first side walls comprise a first surface facing the other first sidewall and a second surface opposite to the first surface; each of the second sidewalls comprises a third surface facing the other second sidewall and a fourth surface opposite to the third surface; the second surface defines a first aligning hole adjacent to a corresponding fourth surface; the fourth surface defines a second aligning hole adjacent to a second surface; each wall portion defines a through hole, the two through holes of the two wall portions are aligned with the first aligning hole and the second aligning hole; the wall portions are fixed to the first aligning hole and the second aligning hole by screws screwing in the through holes, the first aligning hole and the second aligning hole.

4. The liquid crystal display assembly of claim 3, wherein each of the at least one clamping component comprises a hook element and a connection element, the connection element is fixed to a respective fourth surface; the hook element is mounted on the second frame and clamps the connect element.

5. The liquid crystal display assembly of claim 4, wherein the second frame comprises a pair of third sidewalls, a pair of fourth sidewalls, a top surface, and a bottom surface; each of the third sidewalls comprises a fifth surface facing the other third sidewall and a sixth surface opposite to the fifth surface; each of the fourth sidewalls comprises a seventh surface facing the other fourth sidewall and an eighth surface opposite to the seventh surface; the fifth surfaces and the seventh surface perpendicularly connect between the top surface and the bottom surface, each of the fourth sidewalls defines an opening, the opening comprises a pair of inner surfaces perpendicular to the seventh surface; each inner surface defines a pivoting hole; the two pivoting hole of the pair of inner surfaces are aligned with and opposite to each other, the at least one clamping component comprises two clamping components, each hook element comprises an operating portion, a hook portion substantially perpendicularly connected to the operating portion, and two shaft portions; the two shaft portions coaxially extend from a joint of the operation portion and the hook portion in opposite directions; each clamping component further comprises two springs, each spring sleeves around a respective shaft portion; each shaft portion is mounted in a respective pivoting hole and each spring presses on a respective inner surface, the hook portion clamps a respective connect element.

6. The liquid crystal display assembly of claim 5, wherein each connect element comprises a mount portion and a contact portion; the mount portion is mounted on a respective fourth surface; the contact portion extends outwards from the mounting portion, each hook portion clamps a respective contact portion.

7. The liquid crystal display assembly of claim 5, wherein the second frame defines at least a leading groove; each leading groove is positioned at a respective corner of the second frame, each leading groove comprises a first leading surface concaved from a respective fifth surface and a second leading surface concaved from a respective seventh surface; each of the first leading surface and the second leading surface defines an engaging groove, each engaging groove extends from the top surface toward the bottom surface but not passing through the bottom surface; each holding member comprises two stoppers, each of the stoppers is received in a respective engaging groove.

8. The liquid crystal display assembly of claim 7, wherein each leading groove defines a receiving groove in a joint of the first mounting surface and the second mounting surface; the toothed bar is received and is adhered in the receiving groove.

9. The liquid crystal display assembly of claim 1, wherein the liquid crystal display assembly comprises four ejecting components.

10. The liquid crystal display assembly of claim 1, wherein the first frame is made of metal and the second frame is made of plastic.

* * * * *